United States Patent
Amine et al.

(10) Patent No.: US 11,245,114 B2
(45) Date of Patent: Feb. 8, 2022

(54) ELECTROACTIVE MATERIALS FOR RECHARGEABLE BATTERIES

(71) Applicant: UCHICAGO ARGONNE, LLC, Chicago, IL (US)

(72) Inventors: Khalil Amine, Oak Brook, IL (US); Ali Abouimrane, Bolingbrook, IL (US)

(73) Assignee: UChicago Argonne, LLC, Chicago, IL (US)

(*) Notice: Subject to any disclaimer, the term of this patent is extended or adjusted under 35 U.S.C. 154(b) by 862 days.

(21) Appl. No.: 15/410,125

(22) Filed: Jan. 19, 2017

(65) Prior Publication Data
US 2017/0207500 A1    Jul. 20, 2017

Related U.S. Application Data

(60) Provisional application No. 62/281,105, filed on Jan. 20, 2016.

(51) Int. Cl.
*H01M 4/525* (2010.01)
*H01M 4/485* (2010.01)
*H01M 4/505* (2010.01)
*H01M 4/58* (2010.01)

(52) U.S. Cl.
CPC ........ *H01M 4/525* (2013.01); *H01M 4/485* (2013.01); *H01M 4/505* (2013.01); *H01M 4/5825* (2013.01)

(58) Field of Classification Search
None
See application file for complete search history.

(56) References Cited

U.S. PATENT DOCUMENTS

| | | | |
|---|---|---|---|
| 4,508,795 A | 4/1985 | Mamantov | |
| 5,932,632 A | 8/1999 | Biensan et al. | |
| 9,012,091 B2 | 4/2015 | Wu et al. | |
| 9,478,794 B2 | 10/2016 | Wu et al. | |
| 2003/0049540 A1* | 3/2003 | Kohno | H01M 10/052 429/324 |
| 2003/0157409 A1* | 8/2003 | Huang | H01M 2/1686 429/306 |
| 2006/0257737 A1 | 11/2006 | Goh et al. | |
| 2007/0111044 A1* | 5/2007 | Chang | H01M 4/364 429/9 |
| 2011/0143218 A1 | 6/2011 | Issaev et al. | |
| 2013/0043843 A1* | 2/2013 | Amiruddin | H01M 4/131 320/128 |

(Continued)

OTHER PUBLICATIONS

Definition of Ambient Temperature, www.thefreedictionary.com (Year: 2020).*

(Continued)

*Primary Examiner* — Carmen V Lyles-Irving
(74) *Attorney, Agent, or Firm* — Foley & Lardner LLP

(57) ABSTRACT

A secondary battery including a cathode having a primary cathode active material and an alkaline source material selected from the group consisting of $Na_2O$, $Na_2O_2$, $Na_2S$, NaF, NaCl, NaBr, $Li_2O$, $Li_2O_2$, $Li_2S$, LiF, LiCl, LiBr, $Na_2O$, $Na_2O_2$, $Na_2S$, NaF, NaCl, and a mixture of any two or more thereof; an anode having an anode active material; an electrolyte; and a separator.

5 Claims, 1 Drawing Sheet

(56) References Cited

U.S. PATENT DOCUMENTS

2013/0314054 A1* 11/2013 Bergqvist .............. H02J 7/0088
320/162
2014/0212755 A1* 7/2014 Wu ...................... H01M 4/386
429/221

OTHER PUBLICATIONS

Definition of Room or Ambient Temperature, www.newworldencyclopedia.org (Year: 2020).*
Fergus, "Recent developments in cathode materials for lithium ion batteries," Journal of Power Sources 195 (2010), pp. 939-954.
Li et al., "Effect of Overdischarge on Swelling and Recharge Performance of Lithium Ion Cells," Chinese Journal of Chemistry, (2008) 26, 1585-1588.
Whittingham, "Lithium Batteries and Cathode Materials," Chemistry Review, vol. 104, No. 10 (2004), pp. 4271-4301.

* cited by examiner

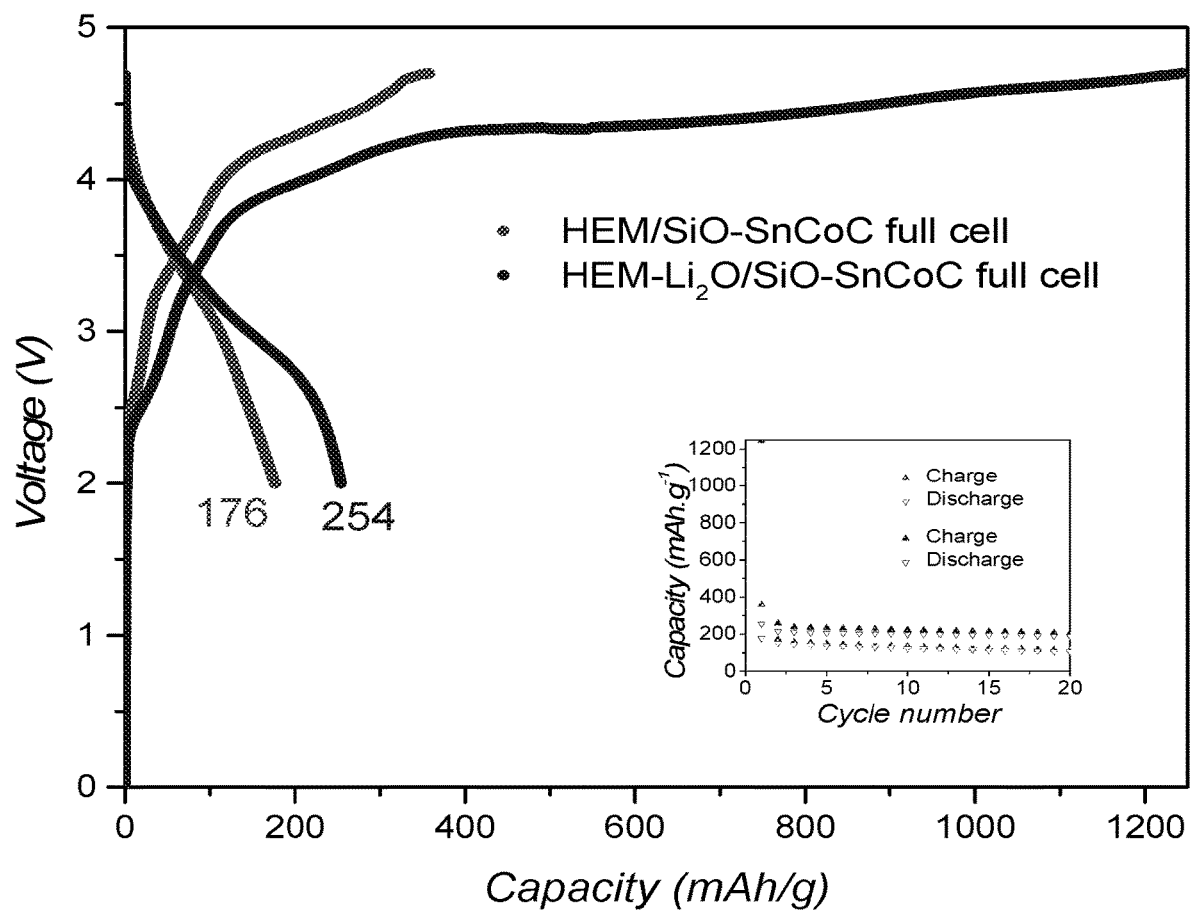

ELECTROACTIVE MATERIALS FOR RECHARGEABLE BATTERIES

CROSS-REFERENCE TO RELATED APPLICATIONS

This application claims the benefit of priority to U.S. Provisional Patent Application No. 62/281,105, filed Jan. 20, 2016, and which is incorporated herein by reference in its entirety for any and all purposes.

GOVERNMENT RIGHTS

The United States Government has rights in this invention pursuant to Contract No. DE-ACO2-06CH11357 between the U.S. Department of Energy and UChicago Argonne, LLC, representing Argonne National Laboratory.

FIELD

The present technology is generally related to secondary batteries. More particularly, the technology is related to electroactive materials that include lithium or sodium.

SUMMARY

In one aspect, a process is provided for the preparation of a lithium-activated, or sodium-activated primary cathode active material. The process includes combining a primary cathode active material and an alkaline source material that is of $Na_2O$, $Na_2O_2$, $NaO_2$, $Na_2S$, $NaF$, $NaCl$, $NaBr$, $Li_2O$, $Li_2O_2$, $LiO_2$, $Li_2S$, $LiF$, $LiCl$, $LiBr$, or a mixture of any two or more thereof to form a pre-activation material; and charging the pre-activation material to a pre-determined voltage at elevated temperature to form the lithium-, or sodium-activated primary cathode active material.

In another aspect, an electrochemical device is provided including the cathode produced by the process above, and an anode including Si, Si—C, SiO, Sn, tin oxide, a composite tin alloy, a transition metal oxide, or a lithium metal nitride.

BRIEF DESCRIPTION OF THE DRAWINGS

FIG. 1 illustrates a first-cycle voltage profile versus capacity and cycling performance (inset) of HEM-$Li_2O$/SiO—SnCoC and HEM/SiO—SnCoC full cells having an electrolyte of 1M $LiClO_4$ in a mixture of ethylene carbonate ethylmethylcarbonate.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In one aspect, a secondary battery is provided having a high specific capacity and good cyclablility, and that can be used safely. The secondary battery includes a positive electrode (cathode), a negative electrode (anode), an electrolyte, and a separator. The cathode includes an alkali (Li or Na) source material configured to supply lithium or sodium to the battery. The secondary batteries include, but are not limited to, lithium ion batteries, lithium air batteries, lithium sulfur batteries, sodium batteries, and other rechargeable batteries. Also included are the cathodes for such secondary batteries, procedures for preparing such cathode and batteries, and methods of operating a secondary battery including such a cathode. In some embodiments, the cathode also includes a cathode active material.

In some embodiments, the secondary batteries and cathodes described herein may be "as-prepared" secondary batteries and cathodes. As used herein, "as-prepared" refers to a cathode or battery, as prepared, prior to any charging of the battery or cathode, or discharging of the battery or cathode. The "as-prepared" does not imply any sort of time constraint, or in other words, the cathode or battery may actually have been prepared long ago, but it was not subjected to any charging or discharging process. Accordingly, the as-prepared cathode or battery has not been subjected to electrochemical processes that would generate any lithium or sodium species other those species that were included in the battery or cathode in the first instance. In some embodiments, the secondary battery is a non-discharged secondary battery. In other embodiments, the cathode is a non-discharged cathode.

The alkaline source materials, are materials that may be activated and supply lithium or sodium ions for secondary batteries. Accordingly, an alkaline source material provides, at least a portion of, the transporter species in a battery: e.g. the lithium ions or the sodium ions. The alkaline source materials include lithium source materials, in some embodiments. In other embodiments, the alkaline source material is a sodium source material. The alkaline source material may include, but is not limited to, $Na_2O$, $NaO_2$, $Na_2O_2$, $Na_2S$, $NaF$, $NaCl$, $NaBr$, $Li_2O$ (lithia), $LiO_2$, $Li_2O_2$, $LiF$, $LiCl$, $LiBr$, $Li_2S$, $Na_2O$, $Na_2O_2$, $Na_2S$, $NaF$, and $NaCl$. Where the secondary battery is a lithium ion battery, a lithium sulfur battery, or a lithium air battery, the alkaline source material may include, but is not limited to, $Li_2O$ (lithia), $Li_2O_2$, $LiO_2$, $LiF$, $LiCl$, $LiBr$, or $Li_2S$. Where the secondary battery is a sodium ion battery, a sodium sulfur battery, or a sodium air battery, the alkaline source material may include, but is not limited to, $Na_2O$, $Na_2O_2$, $NaO_2$, $Na_2S$, $NaF$, and $NaCl$. In some embodiments, the alkaline source material is $Li_2O_2$, $LiO_2$ or $Li_2O$. In some embodiments, the alkaline source material is lithia. It is noted that even where the battery is a sodium battery, lithia may be used to balance the cells.

In our previous work in this area (e.g. see U.S. Pat. No. 9,012,091), we described a procedure for activating the alkaline source material, namely $Li_2O$, in the battery cell. The $Li_2O$ was used to compensate the first cycle irreversibility of a system using high-capacity composite cathode material such as $Li_2MnO_3\text{-}LiMO_2$ (M=Mn, Ni, Co). In this, and other materials, the activation of $Li_2O$ may enable the use of a high energy density anode with high first-cycle irreversibility, such as silicon. In U.S. Pat. No. 9,012,091, $Li_{1.2}Co_{0.1}Mn_{0.55}Ni_{0.15}O_2$ ("HEM")/SiO—SnCo (50 wt % Si, 50 wt % $Sn_{30}Co_{30}O_{40}$) cells were fabricated and tested. The oxide-alloy anode provided good cycling performance but suffered from a high initial irreversible capacity of about 35%. The capacity obtained based on the HEM cathode weight is higher than 250 mAh/g with the presence of $Li_2O$, while it is less than 180 mAh/g without the $Li_2O$ as shown in FIG. 1 of U.S. Pat. No. 9,012,091. As described in Example 1, if $Li_2O$ is used alone in the electrode with binder and a carbon additive, the process of $Li_2O$ activation happens at a voltage above 4.5V, and although not stated in the Example, the charging was conducted at room temperature. Example 2 charged the cell at room temperature and 4.6 V, while in Example 7, it was conducted at 4.4 V. Other examples in U.S. Pat. No. 9,012,091 used similar room temperature conditions with a silicon anode and $Li_2Mn_2O_4$ at high charge voltages.

It has now been surprisingly found that by conducting the initial charging at elevated temperatures, lower voltages may be used to achieve the activation without sacrificing the reversibility of the capacity. The reduction of the potential applied during activation of the alkaline source material, may allow for the use of the alkaline source material as a source of alkali ion batteries. Where the battery is a lithium ion or lithium air systems with a variety of cathode and anode materials within the electrolyte window stability, the alkaline source material may be $Li_2O$ or other materials as described herein. In the illustration of a lithium cell, $Li_2O$ can be used to compensate for the first cycle irreversibility of a lithium ion battery, or as a lithium source for a lithium air system, with anodes such as silicon and tin based materials. In addition, this activation could occur below the starting of the electrolyte decomposition voltage which is approximately 4.2 V. At such a high temperature, $Li_2O$ activation can be done during the first charge or for a less time.

As used herein, the elevated temperatures are temperatures above ambient temperature, but below the melting point of lithium (180.5° C.). In some embodiments, the elevated temperature is about 30° C. to about 150° C. This includes the following ranges: about 30° C. to about 120° C., about 35° C. to about 150° C., about 35° C. to about 120° C., about 40° C. to about 150° C., about 40° C. to about 120° C., about 50° C. to about 150° C., about 50° C. to about 120° C., about 50° C. to about 100° C., and about 50° C. to about 80° C. In any of the above embodiments, the elevated temperature may be from about 50° C. to about 60° C., or about 55° C.

As used herein, the lower voltages used for activation are below approximately 4.5 V. In some embodiments, the lower voltage is from about 3.5 V to about 4.0 V, from about 3.7 V to about 4.5 V, from about 3.7 V to about 4.0 V, from about 3.8 V to about 4.5 V, or from about 3.8 V to about 4.0 V. In any of the above embodiments, the activating voltage may be about 3.9 V.

Where the battery is a lithium air battery, the cathode may include a porous carbon material, a catalyst, and the alkaline source material. For example, where the battery is a lithium air battery, the cathode may include a porous carbon material, a catalyst, and $Li_2O$. In other lithium ion batteries, where the cathode includes non-lithiated active materials, e.g. $MnO_2$, the amount of alkaline source material in the cathode may be from about 1 wt % to about 40 wt % in the as-prepared cathode. This includes where the amount of alkaline source material in the cathode is from about 5 wt % to about 10 wt %, or from about 10 wt % to about 40 wt % in the as-prepared cathode. Where the cathode includes lithiated active materials, e.g. $LiFePO_4$, the amount of alkaline source material in the cathode is from about 1 wt % to about 10 wt % in the as-prepared cathode.

Where the battery is a sodium air battery, the cathode may include a porous carbon material, a catalyst, and $Na_2O$. In other sodium ion batteries, where the cathode includes non-sodiated active materials, e.g. $MnO_2$, the amount of alkaline source material in the cathode may be from about 1 wt % to about 40 wt % in the as-prepared cathode. This includes where the amount of alkaline source material in the cathode is from about 5 wt % to about 10 wt %, or from about 10 wt % to about 40 wt % in the as-prepared cathode.

Where the battery is a sodium ion battery, the cathode may include a porous carbon material, a catalyst, and the alkaline source material. The amount of alkaline source material in the cathode may be from about 1 wt % to about 40 wt %. This includes where the amount of alkaline source material in the cathode is from about 5 wt % to about 10 wt %, or from about 10 wt % to about 40 wt % of the cathode.

The alkaline source materials may be finely divided particles having a mean particle size of less than 20 μm. For example, the particles may have a mean particle size of from about 1 nm to about 20 μm. In some embodiments, the particles may have a mean particle size of from about 1 nm to about 1000 nm. In yet other embodiments, the particles may have a mean particle size of from about 20 nm to about 500 nm. In yet other embodiments, the particles may have a mean particle size of from about 20 nm to about 100 nm. In yet other embodiments, the particles may have a mean particle size of from about 100 nm to about 10 μm.

For example, in some embodiments, the lithia is particulate. The Lithia may have a mean particle size of less than 20 μm, or any of the size ranges listed in the previous paragraph.

The alkaline source material, i.e. the lithia, may be dispersed in or on the cathode by blending, coating, vapor-phase deposition, spraying, firing, and liquid-phase deposition, chemical vapor deposition (CVD), electrochemical deposition, atomic layer deposition (ALD), molten methods utilizing an arc melting furnace, a high frequency induction heater, mechanical alloying, gas atomizing, or other mechanical or chemical means. The lithia may be blended into the cathode material, coated on the cathode, coated on cathode side of the surface of a separator, or coated on a current collector. In some embodiments, lithia and the cathode material may be mixed together with a binder, and any other desired materials, to produce a slurry that is then applied to a current collector and dried to form the cathode.

In addition to the alkaline source material the cathode may include a catalyst configured to activate the lithia at low voltage to release lithium ions. Such catalysts may include, but are not limited to, porous carbon, nanostructured carbon functionalized, polymers, transition metal oxides, non-precious metals, precious metals and metal alloys.

The cathodes, or the cathode(s) of the secondary battery, also include a primary cathodic material. In some embodiments, the cathode includes a mixture of the alkaline source material and the primary cathodic material. The primary cathodic material may include a lithiated positive active material, a non-lithiated positive active material, a sodiated positive active material, a non-sodiated positive active material, or a mixture of any two or more thereof. In some embodiments, the primary cathodic material may include a lithiated positive active material, a sodiated positive active material, or a mixture of lithiated and sodiated positive active material.

The primary cathodic material may include a positive active material that is configured to reversibly insert, or de-insert lithium or sodium. For example, the positive active material may be configured to reversibly insert, or de-insert lithium from about 1.5 V to about 5.0 V vs. lithium. Alternatively, the positive active material may be configured to reversibly insert, or de-insert sodium from 1.2 to 5.0 V vs. lithium. As used herein, "insert" or "de-insert" is used to refer to the movement of either the lithium or sodium ion(s) into, or out of, respectively, the cathode material either through absorption, adsorption, intercalation, conversion, or alloying.

For lithium secondary batteries, or cathodes to be used in lithium secondary batteries, the primary cathodic material may include either lithiated materials or surface-coated lithiated materials. For example, such materials and composites include, but are not limited to, $MnO_2$, $V_2O_5$, $LiVO_3$, $MoS_2$, $FeS_2$, S, air (oxygen), $FeF_3$, $FeF_2$, a spinel, an olivine, a carbon-coated olivine, $LiFePO_4$, $LiCoO_2$, $LiNiO_2$, $LiNi_{1-x}Co_yM^4_zO_2$, $LiMn_{0.5}Ni_{0.5}O_2$, $Li_{1+x}Mn_{2-z}M^4_yO_{4-m}X^1_n$, $LiFe_{1-z}M^6_yPO_{4-m}X^1_n$, $LiMn_{1/3}Co_{1/3}Ni_{1/3}O_2$, $LiMn_2O_4$, $LiFeO_2$, $LiM^4_{0.5}Mn_{1.5}O_4$, $Li_{1+x''}Ni_\alpha Mn_\beta Co_\gamma M^5_\delta O_{2-z''}$ both single composition or gradient composition, $Li_2MnO_3\text{-}Li_aM_bM'_cM''_dO_e$, $Li_nB^1_2(M^2O_4)_3$ (Nasicon), $Li_2MSiO_4$, or a mixture of any two or more thereof, wherein $M^2$ is P, S, Si, W, or Mo; $M^4$ is Al, Mg, Ti, B, Ga, Si, Ni, or Co; $M^5$ is Mg, Zn, Al, Ga, B, Zr, or Ti; A is Li, Ag, Cu, Na, Mn, Fe, Co, Ni, Cu, or Zn; $M^6$ is Al, Mg, Ti, B, Ga, Si, Ni, Mn or Co; M, M', and M'' are transition metals; $B^1$ is Ti, V, Cr, Fe, or Zr; $X^1$ is S or F; $0 \leq x \leq 0.3$; $0 \leq y \leq 0.5$; $0 \leq z \leq 0.5$; $0 \leq m \leq 0.5$; $0 \leq n \leq 0.5$; $0 \leq x'' \leq 0.4$; $0 \leq a \leq 2$; $0 \leq b \leq 1$; $0 \leq c \leq 1$; $0 \leq d \leq 1$; $0 \leq \alpha \leq 1$; $0 \leq \beta \leq 1$; $0 \leq \gamma \leq 1$; $0 \leq \delta \leq 0.4$; $0 \leq z'' \leq 0.4$; $0 \leq n' \leq 3$; $0 < a+b+c+d < 6$; $0 < e \leq 4$; and $0 < \alpha + \beta + \gamma + \delta$.

For sodium secondary batteries, or cathodes to be used in sodiated secondary batteries, the primary cathodic material may include either sodiated materials or surface-coated lithiated materials. For example, such materials and composites include, but are not limited to a spinel, an olivine, a carbon-coated olivine, $NaFePO_4$, $NaCoO_2$, $NaNiO_2$, $NaNi_{1-x}Co_yM^4_zO_2$, $NaMn_{0.5}Ni_{0.5}O_2$, $NaMn_{1/3}Co_{1/3}Ni_{1/3}O_2$, $NaMn_2O_4$, $NaFeO_2$, $NaM^4_{0.5}Mn_{1.5}O_4$, $Na_{1+x''}Ni_\alpha Mn_\beta Co_\gamma M^5_\delta O_{2-z''}F_{z'''}$, $Na_2MnO_3\text{-}Na_aM_bM'_cM''_dO_e$, $Na_nB^1_2(M^2O_4)_3$ (Nasicon), $Na_2MSiO_4$, $NaVPO_4F$ or a mixture of any two or more thereof, wherein $M^2$ is P, S, Si, W, or Mo; $M^4$ is Al, Mg, Ti, B, Ga, Si, Mn, or Co; $M^5$ is Mg, Zn, Al, Ga, B, Zr, or Ti; M, M', and M'' are transition metals; $B^1$ is Ti, V, Cr, Fe, or Zr; $0 \leq x \leq 0.3$; $0 \leq y \leq 0.5$; $0 \leq z \leq 0.5$; $0 \leq m \leq 0.5$; $0 \leq n \leq 0.5$; $0 \leq x'' \leq 0.4$; $0 \leq a \leq 2$; $0 \leq b \leq 1$; $0 \leq c \leq 1$; $0 \leq d \leq 1$; $0 \leq \alpha \leq 1$; $0 \leq \beta \leq 1$; $0 \leq \gamma \leq 1$; $0 \leq \gamma \leq 1$; $0 \leq \delta' \leq 0.4$; $0 \leq z'' \leq 0.4$; $0 \leq n' \leq 3$; $0 < a+b+c+d$, and $0 < e$.

The primary cathodic material may be, in some embodiments, a spinel, an olivine, or a carbon-coated olivine. For example, the primary cathodic material may be, according to an embodiment, a spinel manganese oxide of formula of $Li_{1+x}Mn_{2-z}M^4_yO_{4-m}X^1_n$, wherein $M^4$ is Al, Mg, Ti, B, Ga, Si, Ni, or Co; $X^1$ is S or F; $0 \leq x \leq 0.3$; $0 \leq y \leq 0.5$; $0 \leq z \leq 0.5$; $0 \leq m \leq 0.5$; and $0 \leq n \leq 0.5$. The primary cathodic material may be, according to an embodiment, an olivine of formula of $LiFe_{1-z}M^6_yPO_{4-m}X^1_n$ or a mixture of any two or more such olivines; wherein $M^6$ is Al, Mg, Ti, B, Ga, Si, Ni, Mn or Co; $X^1$ is S or F; $0 \leq x \leq 0.3$; $0 \leq y \leq 0.5$; $0 \leq z \leq 0.5$; $0 \leq m \leq 0.5$; and $0 \leq n \leq 0.5$.

The primary cathodic material may include a blend of a spinel and $Li_{1+x''}Ni_\alpha Mn_\beta Co_\gamma M^5_\delta O_{2-z''}F_{z''}$, wherein $M^5$ is Mg, Zn, Al, Ga, B, Zr, or Ti; $0 \leq x'' \leq 0.4$; $0 \leq \alpha \leq 1$; $0 \leq \beta \leq 1$; $0 \leq \gamma \leq 1$; $0 \leq \delta \leq 0.4$; $0 \leq z'' \leq 0.4$; and $0 < \alpha + \beta + \gamma + \delta$. The ratio of the spinel to the $Li_{1+x''}Ni_\alpha Mn_\beta Co_\gamma M^5_\delta O_{2-z''}F_{z''}$ may be from about 0.5 wt % to about 98 wt %. Alternatively, the primary cathode may include a blend of a olivine or a carbon-coated olivine, and $Li_{1+x''}Ni_\alpha Mn\beta Co_\gamma M^5_\delta O_{2-z''}F_{z''}$, wherein $M^5$ is Mg, Zn, Al, Ga, B, Zr, or Ti; $0 \leq x'' \leq 0.4$; $0 \leq \alpha \leq 1$; $0 \leq \beta \leq 1$; $0 \leq \gamma \leq 1$; $0 \leq \delta \leq 0.4$; $0 \leq z'' \leq 0.4$; and $0 < \alpha + \beta + \gamma + \delta$. The ratio of the ratio of the olivine or carbon-coated olivine to the $Li_{1+x''}Ni_\alpha Mn_\beta Co_\gamma M^5_\delta O_{2-z''}F_{z''}$ may be from about 0.5 wt % to about 98 wt %.

The primary cathodic material may include a non-lithiated material such as $MnO_2$, $V_2O_5$, $LiVO_3$, $MoS_2$, $FeS_2$, S, air or oxygen cathode such as carbon, $FeF_3$, $FeF_2$, or a mixture of any two or more thereof. In other embodiments, the primary cathodic material includes S. In some embodiments, the primary cathodic material is air (oxygen).

Mixing of lithium transition metal rich oxide composites (e.g. $Li_{1.2}Ni_{0.15}Co_{0.1}Mn_{0.55}O_2$) with $Li_2O$ may lead to a significant activation of $Li_2O$ which provide a high capacity (e.g. about 800 mAh/g in Example 12 and about 1140 mAh/g in Example 12) based on the weight of $Li_2O$. $Li_2O$ may be mixed with lithium transition metal rich oxide composites (e.g. $xLiMO_2\text{-}(1-x)Li_2M'O_3$; M, M' are Ni, Mn, V, Ti, Cu, Co, Cr, or Fe, and $0 < x < 1$) and non-lithiated cathode materials (e.g. $MnO_2$, S, $V_2O_5$, $MnF_3$, $FeF_3$). In such a mixture, the cell configuration may be a mixture of $Li_2O$, a lithium manganese rich oxide composite (e.g. $xLiMO_2\text{-}(1-x)Li_2M'O_3$, where M and M' are Ni, Mn, Co, Cr, or Fe, and $0 < x < 1$) and non-lithiated material as the cathode, and either graphite, a carbonaceous material, Si, Sn, SiO, Si—C, $Li_4Ti_5O_{12}$, a tin oxide, a tin carbon, a composite tin alloy, a transition metal oxide, a lithium metal nitride, or a mixture of any two or more thereof as the anode.

In another embodiment, a lithiated cathode material, such as, but not limited to, $LiMn_2O_4$, $LiFePO_4$, or $LiMn_{1/3}Co_{1/3}Ni_{1/3}O_2$ may be mixed with $Li_2O$ and a small amount of lithium transition metal rich oxide composite (e.g. $LiMO_2\text{-}Li_2M'O_3$, where M and M' are Ni, Mn, Co, Cr, or Fe). In this case, the anode may be either graphite, a carbonaceous material, Si, Sn, SiO, Si—C, $Li_4Ti_5O_{12}$, a tin oxide, a tin carbon, a composite tin alloy, a transition metal oxide, a lithium metal nitride, or a mixture of any two or more thereof. As used herein a tin carbon is a tin-carbon composite, a carbon-coated tin, or a tin-carbon alloy.

Where the cathode is for use in a sodium ion electrochemical cell, the primary cathodic material may include $NaM_{1-x}M'_xPO_4$, $Na_xM_yM'_zO_2$, $Na_2FePO_4F$, $Na_2MnPO_4F$, $NaFeSO_4F$, $NaMnSO_4F$, $NaV_{1-a}Cr_aPO_4F$, $Na_2S$, $Na_2Se$, or a mixture of any two or more thereof, wherein $0 < x$; $0 < y+z$; M is Mn, Ni, Fe, Co, or Cu; M' is Cr or Mg; and $0 \leq a \leq 1$.

In addition to the alkali source material and primary cathodic material, the cathode may include a current collector, a porous carbon (e.g. conductive) material, and/or a polymeric binder. The current collector may include copper, stainless steel, titanium, tantalum, platinum, gold, aluminum, nickel, cobalt-nickel alloys, highly alloyed ferritic stainless steel containing molybdenum and chromium; or nickel-, chromium-, or molybdenum-containing alloys. The current collector may be a foil, mesh, or screen, and the porous carbon material and optional metal oxide are contacted with the current collector by casting, pressing, or rolling the mixture thereto. The porous carbon material may include microporous carbon, mesoporous carbon, mesoporous microbeads, graphite, expandable graphite, carbon black, or carbon nanotubes. Commercial examples of carbon black include, but are not limited to, Super P, Black Pearl 2000, Denka Black, Vulcan XC72R, Ketjen black. The polymeric binder may include poly(acrylonitrile), poly(vinylidene fluoride), polyvinyl alcohol, polyethylene, polystyrene, polyethylene oxide, polytetrafluoroethylene, polyimide, styrene butadiene rubber, carboxy methyl cellulose, gelatin, or a copolymer of any two or more such polymers.

The anode in the secondary batteries described above may include graphite, Li metal, Si, Si—C, SiO, Sn, Sb, tin oxide, $Li_4Ti_5O_{12}$, and the like. While the cathode includes lithia, the lithia may be activated during the initial charges and supply lithium source for batteries. The lithia may supply lithium for the anode, and after discharge, the lithium is transmitted from anode to cathode, then supply for the cathode material during battery cycling. The Lithia may compensate for the anode initial irreversible capacity loss and supply lithium to the cathode material, in case a non-lithiated cathode materials is used.

In addition to a cathode and anode, the batteries may include an electrolyte. The electrolyte may include a solvent and a salt. Suitable solvents for use in the electrolytes are typically polar aprotic solvents. Illustrative solvents include, but are not limited to, ethylene carbonate (EC), dimethylcarbonate (DMC), diethylcarbonate (DEC), propylene carbonate (PC), dioloxane, γ-butyrolactone, δ-butyrolactone, dimethyl ether, a silane, siloxane N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a N-alkylpyrrolidone, fluoro ether and fluoro esters, fluoroethylene carbonate, or adiponitrile. Of course, a mixture of any two or more such solvents may also be used. In some embodiments the solvent is a mixture of solvents such as, but not limited to, EC-DMC, EC-DEC, EC-PC, EC-PC-DMC, EC-PC-DEC, or EC-DEC-DMC. In some embodiments, fluorinated derivatives of the above solvents may be used. Suitable salt materials include, but are not limited to, a lithium salt, a sodium salt, an ammonium salt, an alkylammonium salt, a lithium polysulfide, a or a lithium polyselenide. Illustrative salts are $LiPF_6$, $LiClO_4$, $(C_4BO_3Li)$, $(C_2BO_4F_2Li)$, $LiPF_4C_2O_4$, $Li(CF_3SO_2)_2N$, $LiC(SO_2CF_3)_3$, $(Li(C_2F_5SO_2)_2N)$, $LiCF_3SO_3$, $Li_2B_{12}X_{12-n}H_n$, $Li_2B_{10}X_{10-n'}H_{n'}$, where X is a halogen, n is an integer from 0 to 12, and n' is an integer from 0 to 10, $LiAlF_4$, $LiBF_4$, $Li(FSO_2)_2N$, $Li_2SO_4$, $Na_2SO_4$, $NaPF_6$, $NaClO_4$, $LiAlO_2$ $LiSCN$, $LiBr$, $LiI$, $LiAsF_6$, $LiB(Ph)_4$, $LiSO_3CH_3$, $Li_2S_{x''}Li_2Se_{x''}$, $(LiS_{x''}R)_y$ or $(LiSe_{x''}R)_y$; wherein x" is an integer from 1 to 20, y is an integer from 1 to 3 and R is H, alkyl, alkenyl, aryl, ether, F, $CF_3$, $COCF_3$, $SO_2CF_3$, or $SO_2F$.

In addition to a cathode and anode, the batteries may include a separator. Illustrative separators include, but are not limited to, polyethylene, polypropylene, or polyvinylidene fluoride (PVDF).

In another aspect, a method of operating a secondary battery is provided. In the method, an as-prepared secondary battery is provided, the secondary battery having a cathode, an anode, a separator, and electrolyte. The as-prepared secondary battery cathode includes an alkali source material that includes a lithium material, such as Lithia. In particular, the secondary battery is manufactured with lithia blend with a cathode active material in the positive electrode. The freshly assembled battery is in a discharged state. For example, the freshly assembled battery may be fully discharged, with all the alkaline source material, i.e. lithium or sodium, in the positive electrode of the as-prepared battery. The method may include charging the as-prepared secondary battery by transmitting lithium (or sodium) ions from positive electrode to the negative electrode through the electrolyte. The secondary battery may then be discharged by transmitting lithium ions from the anode to cathode through the electrolyte, and then charging again by transmitting lithium (or sodium) ions from cathode to anode through the electrolyte.

In a lithium secondary battery, during the initial charging, lithia in the cathode may be activated by applying a sufficiently high potential. In the discharging process, the cathode active material incorporates the lithium from the anode side, and then the lithiated cathode material releases lithium ions to anode during subsequent charging.

The charging and discharging may occur for numerous cycles while maintaining the high capacities of the cathode active material and maintaining safe operating conditions. In some cases, a catalyst may be used to activate the lithia at lower voltage. Such catalysts include, but are not limited to, are porous carbon, nanostructured carbon functionalized, polymers, transition metal oxides, non-precious metals, precious metals or metal alloys.

A secondary battery includes a positive electrode (i.e. cathode), a negative electrode (i.e. anode), a separator for separating the positive electrode and the negative electrode, and an electrolyte in electrochemical communication with the positive electrode and the negative electrode. The secondary battery also may include a current collector that is in electrical contact with the cathode and a current collector that is electrical contact with the anode. The current collectors may be in electrical contact with one another through an external circuit. The secondary battery may exhibit a jelly roll or stacked construction. A lithium source material (i.e. lithia) is incorporated into the positive electrode side.

The cathode may be formed of an active material, which is typically mixed with a conductive carbon agent and a binder polymer. The active material used in the cathode is preferably a material that can be lithiated at a voltage of about 1.5 V to about 5.0 V versus lithium. Both lithiated or non-lithiated materials such as, but not limited to, $MnO_2$, $MoS_2$, $V_2O_5$, $LiVO_3$, S, $LiMn_2O_4$, $LiCoO_2$, $LiNiO_2$, $LiFePO_4$, or a mixture thereof, can be used as the active material. Lithia, may be distributed in the cathode as lithium source for the battery. The anode, may be formed of an anode active material, which is typically mixed with a conductive carbon agent and a polymeric binder. In some cases, the anode may include lithium metal. The anode active material may be a material that is configured to be lithiated from about 0 V to 2.0 V versus lithium, with a high capacity material such as carbonaceous materials, Si, Si—C, SiO, Sn, tin oxides, composite tin alloys, transition metal oxides, lithium metal nitrides or lithium metal oxide. In some cases, the cathode may contain a minor amount of catalyst in order to activate the lithia at lower voltage. Where the cathode contains a catalyst, the catalyst may be present from about 1 wt % to about 30 wt % of the cathode. In some embodiments, the catalyst is present from about 1 wt % to about 20 wt %. In further embodiments, the catalyst is present from about 1 wt % to about 5 wt %.

When lithia is distributed in the cathode for the battery, it could supply lithium source for the battery. Non-lithiated materials such as $MnO_2$, $V_2O_5$ or $MnS_2$ or a mixture of any two or more thereof, may be used as the active cathode material. Accordingly, the lithia in the cathode side may be of a sufficient amount to supply lithium source. As such, the anode need not include a lithiated material. Because non-lithiated materials generally have a higher specific capacity than lithiated active materials, they can provide increased power. Thus, if the lithium may be provided from an alkali source material in the cathode, high specific capacity and increased power batteries may be produces.

The cathode may be a lithiated material such as $LiFePO_4$, $LiMnPO_4$, $LiCoO_2$, $LiMn_2O_4$, $LiNi_{1/3}Co_{1/3}Mn_{1/3}O_2$, $LiNiO_2$, $LiNi_{0.5}Mn_{1.5}O_4$, or $Li_2MnO_3*LiMO_2$. Lithia F is distributed in the cathode. Where the alkali source material is lithia, both the lithiated material (i.e. cathode active material) and the lithia could supply lithium ions for the battery. Accordingly, in some embodiments, a lithiated, cathode active material (such as $LiFePO_4$, $LiMnPO_4$, $LiCoO_2$, $LiMn_2O_4$, $LiNiO_2$, $LiNi_{0.5}Mn_{1.5}O_4$, $Li_2MnO_3$, $LiMO_2$ (M: Co, Ni, Mn, or a mixture thereof) or a mixture of any two or more thereof) may be included in the cathode, a non-removable lithium material may be used as an anode (such as carbonaceous materials, Si, SiO—, Si—C, Sn, a tin oxides, composite tin alloys, transition metal oxides, lithium metal nitrides, or a mixture of any two or more thereof) as anode. Lithia is in the cathode side. A separator and electrolyte may be used to form a secondary battery.

For the anode a carbonaceous materials, Si, Si—C, SiO, Sn, tin oxide, a composite tin alloy, a transition metal oxide, or a lithium metal nitride may be used. Graphite or graphitized carbons are currently commercial used as an anode material ion lithium ion batteries. The maximum theoretical capacity of a graphite anode is 372 mAh/g. Graphite or carbon anodes typically consume between 7 and 20% of the inserted initial lithium ions to build a passivation layer (SEI) to protect the graphite from continuous chemical reaction with the electrolyte. As this lithium is provided from the cathode material some amount of cathode material will not be active. The presence of a small amount of alkali source material such as $Li_2O$ ($Li_2O$ with theoretical capacity of 1786 mAh/g vs. $LiCoO_2$ with theoretical capacity of 270 mAh/g) in the cathode will increase the battery energy density as this lithium is going to compensate the lithium loss due the formation of passivation layer (SEI) on the anode.

The low specific capacity of graphite anodes is a limiting factor in the development of Li-ion batteries with high energy density. To increase the specific energy of lithium ion batteries, alternative anode materials with higher capacity are needed. Si is one of potential anode material, its superior theoretical specific capacity of 3579 mAh/g, the highest capacity of any known anode materials at room temperature other than Li metal. However, one of problems is that Si-based anodes suffer from huge irreversible capacity loss during initial discharge and charge process, which consumes a lot of lithium from the cathode side and lower capacity of the batteries. So Si anodes were not considered to satisfy the needs of practical applications. However, using Si as an anode, the capacity is about 3000 mAh/g, but the anode first cycle efficiency is low, in some case, lower than 50%. Accordingly, an Si anode will irreversibly consume a large amount of lithium source from the cathode. However, where the present cathodes with the alkali source materials are used with a Si anode, the Lithia may compensate for the irreversible capacity of the Silicon or tin based anode and maintain cathode material itself efficiency.

In lithium (or sodium)-air (oxygen) batteries, the positive electrode is a porous activated positive electrode such as a porous carbon material. The anode is typically lithium (or sodium) metal. Where the cathode of a lithium (or sodium)-air battery is as above, with an alkali source material such as lithia (or sodia) in the porous carbon, it is not necessary to have the lithium (or sodium) metal as anode. In this case, the present cathodes with the alkali source materials are used with a Si or Sn based anode, the lithia (or sodia) will provide lithium (or sodium) that will alloy with these anodes.

The batteries and electrochemical cells described herein may be used for various types of applications. For example, the secondary batteries may be used in portable electronics such as cell phones, laptop computers, and cameras, and in large power applications such in electric vehicles, hybrid electric vehicles, plug-in hybrid electric vehicles and smart grids.

The secondary batteries and cathodes described herein have high specific capacity, safe operating conditions, and good cycleability. In particular, because an alkali source material, i.e. lithia, is present in the positive electrode and supplies the lithium source for the battery, non-lithiated materials may be used as the preferred cathode active material in the secondary battery. Such non-lithiated materials may have higher specific capacities than the lithiated material presently used in lithium ion battery. Unlike traditional lithium secondary batteries having non-lithiated cathode active materials and metallic lithium anodes, it has been discovered that secondary batteries produced non-lithiate cathode active material with lithium source material lithia of the invention combine with the anodes operate safely and do not generate lithium dendrite upon cycling. The alkali source materials, such as lithia, in the cathode may compensate for irreversible capacity loss of the anode such as Si and improve the cathode material coefficient of utilization.

The present invention, thus generally described, will be understood more readily by reference to the following examples, which are provided by way of illustration and are not intended to be limiting of the present invention.

EXAMPLES

Example 1

Full cells were made using a cathode limited configuration (anode capacity/HEM-cathode capacity ratio was 3). Full cells with a SnCoC—SiO anode were cycled between 2 V and 4.5 V. The electrolyte used was 1M $LiClO_4$ in a mixture of ethylene carbonate and ethylmethylcarbonate (EC/EMC). The HEM-$Li_2O$ electrode was made of 50 wt % $Li_{1.2}Ni_{0.15}Mn_{0.55}Co_{0.1}O_2$; 20 wt % $Li_2O$; 20 wt % Super P; and 10 wt % PVDF. $Li_2O$ may be activated at room temperature to compensate the lithium consumption of silicon based anode materials once it is used in a full cell.

Example 2

Voltage profile versus charge capacities of HEM/LTO and HEM-$Li_2O$/$Li_4Ti_5O_{12}$ (LTO) full cells (I=3 mA/g) and recovered LTO/Li half-cell in Gen I (1M$LiClO_4$ in EC/EMC) electrolyte (I=8 mA/g). The FIGURE demonstrates that $Li_2O$ is activated at room temperature at ~4.2 V and at 3.9 V at 55° C. (vs Li/Li+).

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process for the preparation of a lithium-activated or sodium-activated primary cathode active material, the process comprising:
    combining a primary cathode active material and an alkaline source material selected from the group consisting of $Na_2O$, $NaO_2$, $Na_2O_2$, $Na_2S$, NaF, NaCl, NaBr, $Li_2O$, $LiO_2$, $Li_2O_2$, $Li_2S$, LiF, LiCl, LiBr, and a mixture of any two or more thereof to form a pre-activation material;
    assembling a battery comprising a cathode comprising the pre-activation material; and
    charging the battery and the pre-activation material to a pre-determined voltage at an elevated temperature to form the lithium-activated or sodium-activated primary cathode active material,
    wherein:
        the elevated temperature is from about 50° C. to about 60° C. and the pre-determined voltage is about 3.7 V to about 4.0 V;
        the alkaline source material is present from about 1 wt % to about 40 wt %; and
        the primary cathode active material comprises sulfur or a carbon cathode and the battery is a lithium-air battery or a sodium-air battery.

2. The process of claim 1 for the preparation of a lithium activated primary cathode active material, wherein the alkaline source material comprises $Li_2O$.

3. The process of claim 1, wherein the alkaline source material is present from about 10 wt % to about 40 wt %.

4. The process of claim 1, wherein the alkaline source material is present from about 5 wt % to about 10 wt %.

5. An electrochemical device comprising:
    the cathode produced by the process of claim 1; and
    an anode comprising graphite, graphene, carbon, Si, Si—C, SiO, Sn, tin oxide, a composite tin alloy, a transition metal oxide, or a lithium metal nitride.

* * * * *